Jan. 18, 1949.   S. L. GOLDSBOROUGH   2,459,639
HIGH-SPEED SEQUENTIAL RELAYING SYSTEM
Filed Nov. 8, 1945
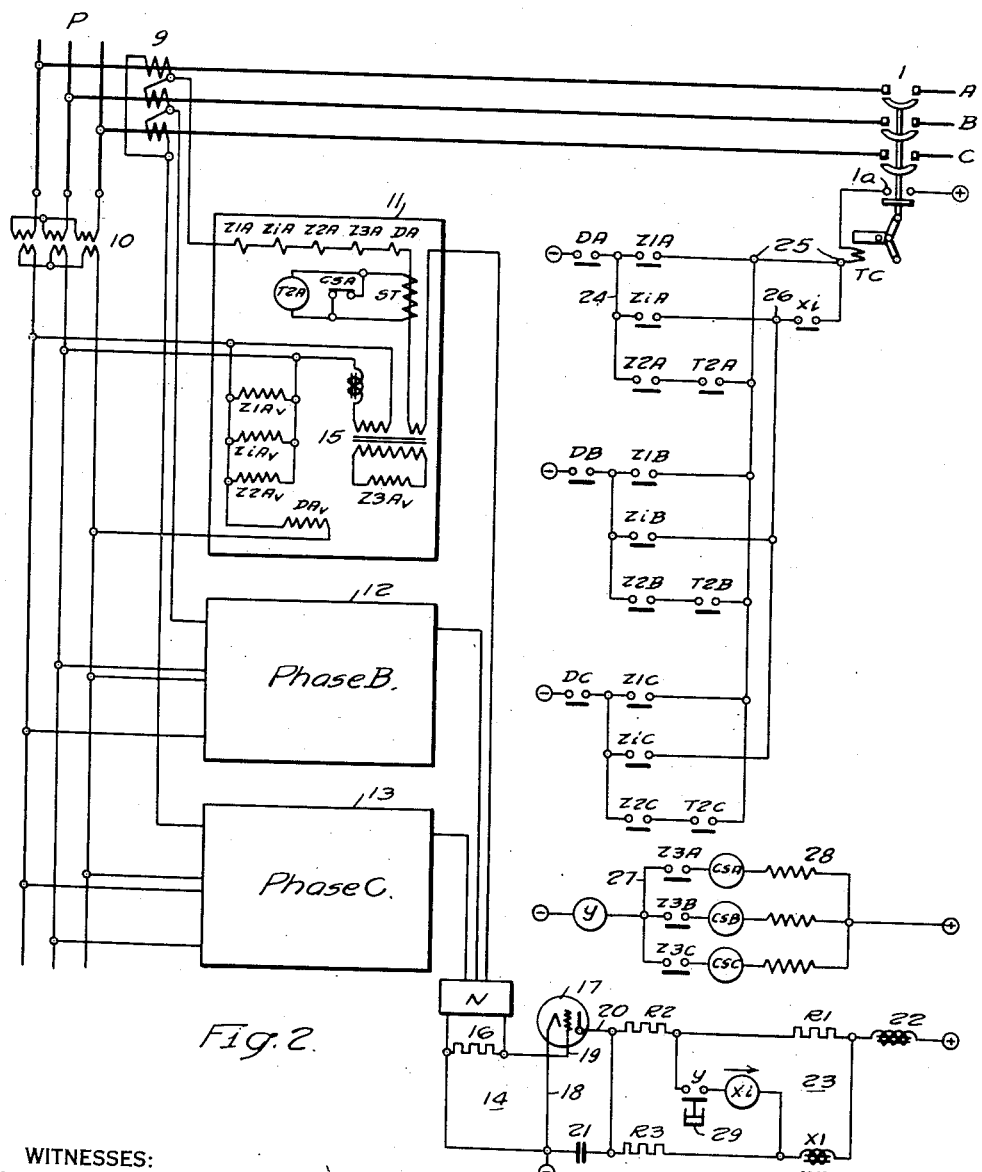
INVENTOR
Shirley L. Goldsborough.
BY O. B. Buchanan
ATTORNEY
WITNESSES:

Patented Jan. 18, 1949

2,459,639

UNITED STATES PATENT OFFICE 2,459,639

HIGH-SPEED SEQUENTIAL RELAYING SYSTEM

Shirley L. Goldsborough, Basking Ridge, N. J., assignor to Westinghouse Electric Corporation, East Pittsburgh, Pa., a corporation of Pennsylvania Application November 8, 1945, Serial No. 627,500

19 Claims. (Cl. 175—294)

My invention relates to relaying systems for protecting transmission lines against faults, and it has particular relation to novel means for determining, without the use of a communication-channel from the far end of a protected line-section, whether a fault which is located close to the far end is within the line-section or beyond said far end.

The broad object of my present invention is to avail myself of the fact that, in a very large number of cases, the fault-current entering one end of a faulted line-section increases when the breaker at the other end opens, or, conversely, the line-voltage at the first-mentioned end decreases.

A more specific object of my invention is to utilize this incremental fault-current or voltage, in combination with a distance-responsive fault-detector at the relaying point, to effect an automatic sequential tripping of the line-breakers, for faults beyond the reach of the first-zone distance-element. A relay which is responsive to the change in current-magnitude or voltage-magnitude is employed, with means for preventing its response to the first change in current or voltage. Means are provided for preventing a response to faults occurring beyond the far end of the protected line-section.

With the foregoing and other objects in view, my invention consists in the apparatus, combinations, circuits, systems, methods and parts, hereinafter described and claimed, and illustrated in the accompanying drawing, wherein:

Figure 1 is a line-diagram, indicating successive sections of a transmission line, such as a three-phase line, although my invention is not limited to any particular number of phases, or even to alternating-current lines;

Fig. 2 is a diagrammatic view of circuits and apparatus, indicating terminal-equipment suitable for carrying out my invention at one terminal of the protected line-section, it being understood that similar terminal-equipment would be provided at the other line-terminal.

My invention is indicated, in an illustrative form, as being applicable to an alternating-current transmission line which extends for a considerable distance, between various separated bus-terminals which are indicated, in Fig. 1, at P, Q, R, etc. Line-breakers 1 and 2 are provided at terminals P and Q, for making it possible to segregate the line-section PQ in case of a fault thereon. In like manner, line-breakers 3 and 4 are provided at terminals Q and R, respectively, for protecting the line-section QR, and a line-breaker 5 is shown, at the far side of the bus at terminal R, for protecting that end of the line-section that extends on beyond R.

In Fig. 2, I have shown the terminal equipment, at terminal P, for automatically controlling the breaker 1, with the understanding that this illustration is typical of the equipment which is to be provided for controlling each of the other breakers. A three-phase bus is indicated at P, and the three-phase line-section PQ of Fig. 1 is indicated, in Fig. 2, by the line phase-conductors A, B and C, the same being connected to the bus P through a three-pole circuit-breaker 1, which is provided with a trip-coil TC, and an auxiliary breaker-switch 1a. Delta-connected line-current transformers 9 are provided for deriving suitable relaying currents, and a potential transformer 10 is provided for deriving suitable relaying voltages. The relaying currents and voltages are supplied to suitable relaying equipment, including panels 11, 12 and 13, for phases A, B and C, respectively, and certain additional relaying equipment 14, which is provided for responding to fault-increments.

I have illustrated a distance-type fault-detector relaying system, utilizing impedance, or modified-impedance, relays Z1, Z2 and Z3 for responding to faults on the transmission line, at different distances away from the relaying station P, the distance-zone being distinguished by the numerals 1, 2 and 3. I also provide a directional element D, in accordance with known practice. In accordance with my present invention, I also provide an additional distance-responsive element Zi, which has a reach not quite as far as the Z2 element.

A complete set of these relays, Z1, Zi, Z2, Z3 and D, is provided for each of the line-phases A, B and C, being distinguished by the addition of the letters A, B and C, respectively, to designate the several phases. The alternating-current connections for the phase-A relays are shown in the panel 11, in Fig. 2, the internal wirings of panels 12 and 13 being omitted because they are duplicates of panel 11. In Fig. 2, the current-coils and the contacts of the various relays are marked with the relay-designation. The voltage-coils of the impedance and directional relays are indicated with a subscript $v$. It will be noted, from the panel 11, that the impedance elements Z1A, ZiA and Z2A are illustrated as unmodified impedance elements, which oppose the pull of a current-coil with a voltage-energized coil, while the third-zone impedance element Z3A has a voltage-coil Z3A$_v$ which is energized, through a mixing transformer 15, so as to be responsive to the vectorial sum of both a voltage and a current, so that this relay may be adjusted to respond to modified impedance characteristics, as is known in the art.

The phase-A relaying panel is also illustrated as comprising a current-energized saturating transformer ST, which is utilized to energize a timer T2A, under the control of an auxiliary relay CSA, which will be subsequently described.

In accordance with the illustrated form of embodiment of my invention, the three relaying currents, after passing through the current-circuits of the respective panels 11, 12 and 13, are passed through a current-network N, which may be any current-mixing device for providing a single-phase output which is responsive to the fault-currents, no matter which phase or phases is or are faulted. The single-phase output of the current-network N is fed into a resistor 16, the voltage of which is utilized to detect increments in the fault-current, as a part of the previously mentioned special relaying apparatus 14, which is provided in accordance with my invention.

For responding to the fault-current increments, I have illustrated a triode tube 17 having a cathode-circuit 18 which is connected to a negative direct-current source, indicated at (—), a grid-circuit 19, and a plate-circuit 20. The resistor 16 is connected between the grid-circuit 19 and the cathode-circuit 18, thus causing the plate-circuit 20 to pass both alternating current and direct current, in response to the application of an alternating-current voltage on the grid. The alternating-current component of the plate-current is bypassed by any suitable means, symbolically indicated by means of a bypassing capacitor 21, which is connected between the plate-circuit 20 and the cathode-circuit 18.

The plate-circuit 20 of the increment-responsive tube 17 is connected to the positive terminal (+) of a direct-current source, through a choke coil 22, and a network 23 which is responsive to increments in the direct-current component of the plate-current in the tube 17. The increment-responsive network 23 is indicated in the form of a normally balanced bridge, comprising three resistors R1, R2 and R3 and an inductance X1, the resistance R1 and inductance X1 being in parallel with each other, and the other two resistances R2 and R3 being in parallel with each other. Across the bridge-diagonal is a circuit comprising the normally open make-contact of an auxiliary relay $y$, and the operating coil of an auxiliary relay $Xi$, the relay $Xi$ being illustrated as a polarized relay which responds when the current flows in the direction indicated by the arrow.

The relaying equipment also includes direct-current circuits which are diagrammatically indicated in Fig. 2.

Three tripping circuits are provided, for the three line-phases A, B and C, which will be exemplified by a description of only the phase-A circuit. The phase-A tripping-circuit starts with the negative terminal (—) and the directional-relay contact DA, thence passing to a relaying-circuit conductor 24, from which three trip-circuit paths are provided. In the first path, the conductor 24 is connected to the trip-circuit 25 of the trip-coil TC, through the contact of the first-zone distance-element Z1A. In the second path, a contact of the auxiliary distance-element ZiA connects the conductor 24 to a conductor 26, which is common to all three phases, and the conductor 26 is connected to the trip-circuit 25 through a make-contact of the auxiliary relay $Xi$. In the third path, the conductor 24 is joined to the trip-circuit 25 through the second-zone distance-responsive contact Z2A and the timer-contact T2A. The trip-coil circuit is completed through the auxiliary breaker-switch 1a, and thence to the positive terminal (+).

In addition to the three tripping circuits, for the phases A, B and C, respectively, I also provide a sensitive fault-detector circuit, which begins at the negative terminal (—), and passes through the coil of the auxiliary relay $y$, and thence to a relay-circuit conductor 27. Here the circuit divides in three parallel paths, one for each phase, before reaching the positive terminal (+). The phase-A circuit comprises the third-zone distance-responsive contact Z3A, connected in series with the operating coil of the auxiliary relay CSA, and a suitable impedance 28. The phase-B and phase-C circuits correspond to the phase-A circuit just mentioned, with a change of letters. The auxiliary relays, such as CSA, are utilized for various purposes, only one of which is indicated on the simplified diagram which is shown in Fig. 2. Thus, referring to the relaying panel 11, it will be noted that a back-contact of the auxiliary relay CSA is normally connected in shunt across the coil of the timer relay T2A, so that the operation of the timer is not initiated until the occurrence of a fault.

In the operation of my invention, whenever any fault occurs on the transmission system, within the reach of the sensitive fault-detector elements Z3A, Z3B and Z3C, the auxiliary relay $y$ is energized, but this relay has a time-delay action, as symbolically indicated by a dashpot 29 associated with its make-contact, so that its make-contact is not closed until just before the separation of the breaker-contacts of the first line-breaker which responds to the fault, thus affording time for the first fault-current increment to subside, and thus making the auxiliary increment-responsive relay $Xi$ unresponsive to the change in the line-current which occurred when the fault first came on the line.

Referring to Fig. 1, if the fault is within the reach of the first-zone element Z1, the balance-point of which is indicated at $P_1$, instantaneous tripping will occur in the normal manner, through the first tripping circuit including the Z1 contact of Fig. 2.

If the fault is beyond the reach of the Z1 element, as indicated at $P_1$ in Fig. 1, and within the reach of the Zi element, which is indicated at $P_i$ in Fig. 1, then the second tripping circuit will become effective if, and as soon as, the increment-responsive relay $Xi$ responds. In Fig. 1, it will be noted that the balance-point $P_i$ of the auxiliary distance-element Zi, which is associated with the breaker 1 at terminal P, is beyond the far-end terminal Q of the protected line-section, and in the first part of the next adjacent line-section QR, between the terminal Q and the balance-point $R_1$ of the first-zone distance-element at the station R, which is associated with the breaker 4.

If the fault, then, is between the points $P_1$ and $P_i$, in Fig. 1, it is necessary to discriminate whether the faul is before or beyond the terminal Q. If the fault is beyond the terminal Q, and between this terminal Q and point $P_i$ in Fig. 1, the breaker 3, at the Q-terminal of the line-section QR, will promptly open, thus preventing an increase in the line-current through the breaker 1, at station P, and thus preventing a response of the increment-relay $Xi$, because of the polarized or unidirectional characteristic of the said increment-relay $Xi$, which is adjusted so that it does not respond to a decrease in the line-current at the station P.

If the fault is on the near side of the terminal Q, that is, between the point $P_1$ and the bus Q, in Fig. 1, then the breaker 2, at the Q-terminal end of the line-section PQ, will promptly open, the effect of which, in a very large number of cases, will be to cause an increase in the amount of fault-current flowing into the faulted line-section PQ at the relaying terminal P. This will cause the increment-responsive relay $Xi$ to respond, thus completing the second trip-circuit, through the $Zi$ contact, in Fig. 2.

The increment-responsive relay $Xi$ responds to the second increase in the direct-current component of the plate-current of the tube 17, because of its connection in the diagonal of a bridge-circuit $R1$, $XI$; $R2$, $R3$, which is normally balanced, during steady-state conditions. In other words, the resistance of the inductance $XI$ is the same as the resistance of the parallel-connected resistor $R1$. When the fault first comes on the transmission line, the auxiliary-relay contact $y$ will be open, and this relay $y$ will begin to close its contact, but will not complete the closure until the substantial subsidence of the transient in the direct-current component of the plate-current of the tube 17. The time-delay of the auxiliary relay $y$ can be set to be nearly as long as the tripping time required by the line-breaker which is closest to the fault.

In the assumed case, with a fault between the Fig. 1 points $P_1$ and Q, this first-tripping line-breaker would be the breaker 2. When the breaker 2 opens, and the fault-current at the relaying station P again increases, the direct-current component of the plate-current in the tube 17 also increases, but because of the inductive impedance of the inductor $XI$, this current can not increase as rapidly in the bridge-leg $XI$ as in the bridge-leg $R1$, so that a current flows through the increment-responsive relay-coil $Xi$, in the direction of the arrow, which is also the direction in which the polarized relay $Xi$ responds, thus causing said relay $Xi$ to respond to the second fault-current increment.

It should be noted, in Fig. 1, that the balance-point $P_1$ of the auxiliary distance-element $Zi$ should be set a few percent short of the balance-point $R_1$ of the $ZI$ element at the breaker 4, so that the auxiliary relay $Zi$, at station P, will not respond if a fault occurs in the portion $R_1$—R of the next adjacent line-section QR. In other words, the auxiliary distance-element $Zi$ at station P is set so that it will not respond to faults which are within the reach of the first-zone distance-element at the far terminal R of the next adjacent line-section QR, that is, the line-section next beyond the protected line-section PQ. This precaution is taken, because, if the fault is beyond the terminal Q, and somewhere in the line-section QR, and if the line-breaker 4, at the far end of the line-section QR, should be the first to open, then the opening of the breaker 4 would very likely produce an increment in the fault-current flowing at station P, thus causing an erroneous tripping-operation at P, because of the response of the increment-responsive relay $Xi$, under conditions when the fault was not in the protected line-section PQ.

This is the reason why it is not desirable (without precautions) to utilize the normal second-zone impedance-element Z2, at station P, in combination with the increment-responsive relay $Xi$, to produce a sequential tripping-operation in response to the second fault-current increment. In Fig. 1, a typical balance-point of the second-zone distance-responsive element Z2, for the breaker 1 at station P, is indicated at $P_2$.

For the reason just described, in carrying out my invention, I prefer to leave the second-zone tripping-circuits undisturbed, these circuits being utilized, as in normal service, merely as a back-up protection, for effecting a tripping operation of the breaker 1, in response to a fault between the points $P_1$ and $P_2$ of Fig. 1, but only after a time-delay, as determined by the timer T2, sufficient for the breaker 3, at the Q-terminal of the next adjacent line-section QR, to have opened, if it is going to open.

In the foregoing illustration and description, I wish it to be understood that the increment-responsive apparatus 14 is symbolic or representative of any apparatus which responds, in the proper direction, to the second increment in any electrical quantity of the line, the first increment being responsive to the occurrence of the fault, and the second increment being responsive to the opening of the breaker 2 at the far-end terminal Q of the protected line-section PQ. If the electrical quantity in question is the line-current, then the increments in question will be positive increments, corresponding to successive increases in the line-current; whereas, if the electrical quantity in question is the line-voltage, then the first increment will be negative, and the line-voltage will be reduced when the fault first occurs, but when the fault is partially cleared by the opening of the breaker at the far end of the protected line-section, the line voltage will be increased.

Therefore, while I have illustrated my invention in but a single simple illustrative form of embodiment, I desire that such illustration shall be regarded as symbolic of the broad principles of my invention, as I am aware that many changes, in detailed form of execution, may be made in my invention. I desire, therefore, that the appended claims be accorded the broadest construction consistent with their language.

I claim as my invention:

1. Terminal protective-relay equipment for controlling a terminal-located circuit-interrupter means in a section of a transmission-line of a type having an electrical line-quantity which is subject, at times, to two increments, one when a fault first occurs on the line, and the other when the fault is first cleared by a circuit-interrupter means at some point beyond the fault, as viewed from the relaying terminal, said terminal equipment comprising the combination, with said terminal-located circuit-interrupter means, of a first relaying means, for quickly responding to fault-conditions out on the protected line-section, with only sufficient sensitivity, in general, to respond to faults within the protected line-section, and for quickly effecting an opening operation of the terminal-located circuit-interrupter means, a second relaying means, for responding to fault-conditions out on the line, with sufficient sensitivity, in general, to respond to faults beyond the far end of the protected line-section, increment - responsive means, for selectively responding to said increment means in said line-quantity, and fault-detector means, operative only after a time-delay, for obtaining a joint response to said second relaying means and said increment-responsive means, and for thereupon quickly effecting an opening operation of the terminal-located circuit-interrupter means.

2. The invention as defined in claim 1, characterized by said increment-responsive means being selectively responsive to increments of the sign caused by the clearing of a fault by a circuit-interrupter means at some point beyond the fault, as viewed from the relaying terminal.

3. The invention as defined in claim 1, characterized by the portion of the next line-section, which is included within the reach of the second relaying means, being less, in general, than the portion of the next line-section which is not included within the reach of the first relaying means at the far end of the said next line-section.

4. The invention as defined in claim 1, characterized by means for insuring that said joint response is obtained, in the event of a fault in the next line-section, only when the fault is first cleared by an opening operation of the circuit-interrupter means at the near end of the said next line-section.

5. The invention as defined in claim 1, characterized by said time-delay being, in general, less than the time necessary for the first relaying means to complete an opening operation of the circuit-interrupter means.

6. The invention as defined in claim 1, characterized by said increment-responsive means being selectively responsive to increments of the sign caused by the clearing of a fault by a circuit-interrupter means at some point beyond the fault, as viewed from the relaying terminal, and further characterized by the portion of the next line-section, which is included within the reach of the second relaying means, being less, in general, than the portion of the next line-section which is not included within the reach of the first relaying means at the far end of the said next line-section.

7. The invention as defined in claim 1, characterized by said increment-responsive means being selectively responsive to increments of the sign caused by the clearing of a fault by a circuit-interrupter means at some point beyond the fault, as viewed from the relaying terminal, and further characterized by means for insuring that said joint response is obtained, in the event of a fault in the next line-section, only when the fault is first cleared by an opening operation of the circuit-interrupter means at the near end of said next line-section.

8. The invention as defined in claim 1, characterized by said increment-responsive means being selectively responsive to increments of the sign caused by the clearing of a fault by a circuit-interrupter means at some point beyond the fault, as viewed from the relaying terminal, and further characterized by said time-delay being, in general, less than the time necessary for the first relaying means to complete an opening operation of the circuit-interrupter means.

9. The invention as defined in claim 1, characterized by the portion of the next line-section, which is included within the reach of the second relaying means, being less, in general, than the portion of the next line-section which is not included within the reach of the first relaying means at the far end of the said next line-section, and further characterized by said time-delay being, in general, less than the time necessary for the first relaying means to complete an opening operation of the circuit-interrupter means.

10. The invention as defined in claim 1, characterized by means for insuring that said joint response is obtained, in the event of a fault in the next line-section, only when the fault is first cleared by an opening operation of the circuit-interrupter means at the near end of the said next line-section, and further characterized by said time-delay being, in general, less than the time necessary for the first relaying means to complete an opening operation of the circuit-interrupter means.

11. The invention as defined in claim 1, characterized by said increment-responsive means being selectively responsive to increments of the sign caused by the clearing of a fault by a circuit-interrupter means at some point beyond the fault, as viewed from the relaying terminal, and further characterized by the portion of the next line-section, which is included within the reach of the second relaying means, being less, in general, than the portion of the next line-section which is not included within the reach of the first relaying means at the far end of the said next line-section, and still further characterized by said time-delay being, in general, less than the time necessary for the first relaying means to complete an opening operation of the circuit-interrupter means.

12. The invention as defined in claim 1, characterized by said increment-responsive means being selectively responsive to increments of the sign caused by the clearing of a fault by a circuit-interrupter means at some point beyond the fault, as viewed from the relaying terminal, and further characterized by means for insuring that said joint response is obtained, in the event of a fault in the next line-section, only when the fault is first cleared by an opening operation of the circuit-interrupter means at the near end of the said next line-section, and still further characterized by said time-delay being, in general, less than the time necessary for the first relaying means to complete an opening operation of the circuit-interrupter means.

13. The invention as defined in claim 1, characterized by said line-quantity being a line-current quantity.

14. The invention as defined in claim 1, characterized by said line-quantity being a line-current quantity, and further characterized by said increment-responsive means being selectively responsive to increments of the sign caused by the clearing of a fault by a circuit-interrupter means at some point beyond the fault, as viewed from the relaying terminal.

15. The invention as defined in claim 1, characterized by said line-quantity being a line-current quantity, and further characterized by the portion of the next line-section, which is included within the reach of the second relaying means, being less, in general, than the portion of the next line-section which is not included within the reach of the first relaying means at the far end of the said next line-section.

16. The invention as defined in claim 1, characterized by said line-quantity being a line-current quantity, and further characterized by means for insuring that said joint response is obtained, in the event of a fault in the next line-section, only when the fault is first cleared by an opening operation of the circuit-interrupter means at the near end of the said next line-section.

17. The invention as defined in claim 1, characterized by said line-quantity being a line-current quantity, and further characterized by said time-delay being, in general, less than the time necessary for the first relyaing means to complete an opening operation of the circuit-interrupter means.

18. The invention as defined in claim 1, characterized by said line-quantity being a line-current quantity, characterized by said increment-responsive means being selectively responsive to increments of the sign caused by the clearing of a fault by a circuit-interrupter means at some point beyond the fault, as viewed from the relaying terminal, and further characterized by the portion of the next line-section, which is included within the reach of the second relaying means, being less, in general, than the portion of the next line-section which is not included within the reach of the first relaying means at the far end of the said next line-section, and still further characterized by said time-delay being, in general, less than the time necessary for the first relaying means to complete an opening operation of the circuit-interrupter means.

19. The invention as defined in claim 1, characterized by said line-quantity being a line-current quantity, and further characterized by said increment-responsive means being selectively responsive to increments of the sign caused by the clearing of a fault by a circuit-interrupter means at some point beyond the fault, as viewed from the relaying terminal, and further characterized by means for insuring that said joint response is obtained, in the event of a fault in the next line-section, only when the fault is first cleared by an opening operation of the circuit-interrupter means at the near end of the said next line-section, and still further characterized by said time-delay being, in general, less than the time necessary for the first relaying means to complete an opening operation of the circuit-interrupter means.

SHIRLEY L. GOLDSBOROUGH.

REFERENCES CITED

The following references are of record in the file of this patent:

UNITED STATES PATENTS

| Number | Name | Date |
|---|---|---|
| 1,920,329 | Tippett | Aug. 1, 1933 |
| 2,378,268 | Warrington | June 12, 1945 |